US012524558B2

(12) United States Patent
Yannuzzi et al.

(10) Patent No.: US 12,524,558 B2
(45) Date of Patent: Jan. 13, 2026

(54) DATA COMPLIANCE BASED ON AUTOMATED ANNOTATIONS AND PROTECTION BINDINGS

(71) Applicant: Cisco Technology, Inc., San Jose, CA (US)

(72) Inventors: Marcelo Yannuzzi, Vufflens-la-Ville (CH); Hervé Muyal, Gland (CH); Jean Andrei Diaconu, Haute-Savoie (FR); Frank Brockners, Cologne (DE); Carlos Goncalves Pereira, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 531 days.

(21) Appl. No.: 17/859,693

(22) Filed: Jul. 7, 2022

(65) Prior Publication Data

US 2024/0012918 A1 Jan. 11, 2024

(51) Int. Cl.
*G06F 21/62* (2013.01)
*G06F 9/54* (2006.01)

(52) U.S. Cl.
CPC .............. *G06F 21/62* (2013.01); *G06F 9/543* (2013.01); *G06F 21/6209* (2013.01)

(58) Field of Classification Search
CPC ..................................................... G06F 21/62
See application file for complete search history.

(56) References Cited

U.S. PATENT DOCUMENTS

| | | | |
|---|---|---|---|
| 9,949,129 B1 | 4/2018 | Henry et al. | |
| 10,484,429 B1 * | 11/2019 | Fawcett | H04L 63/20 |
| 10,713,664 B1 | 7/2020 | Alagappan et al. | |
| 11,551,117 B1 * | 1/2023 | Malhotra | G06Q 50/26 |
| 2005/0021689 A1 | 1/2005 | Marvin et al. | |
| 2006/0075228 A1 * | 4/2006 | Black | H04L 63/104 |
| | | | 713/167 |
| 2009/0099860 A1 | 4/2009 | Karabulut et al. | |
| 2014/0280961 A1 | 9/2014 | Martinez et al. | |
| 2015/0281287 A1 | 10/2015 | Gill et al. | |
| 2016/0335454 A1 * | 11/2016 | Choe | G06Q 30/018 |
| 2016/0344736 A1 | 11/2016 | Khait et al. | |
| 2017/0170970 A1 | 6/2017 | Leighton et al. | |
| 2017/0201569 A1 | 7/2017 | Fu et al. | |
| 2017/0300309 A1 | 10/2017 | Berger et al. | |

(Continued)

OTHER PUBLICATIONS

"Global Apps, Local Compliance", online: https://incountry.com/, accessed May 24, 2022, 10 pages.

(Continued)

*Primary Examiner* — Bradley W Holder
(74) *Attorney, Agent, or Firm* — Lee & Hayes, P.C.

(57) ABSTRACT

In one embodiment, a device obtains program code of an application that defines annotations denoting a plurality of data types handled by the application. The device determines, for each of the plurality of data types, an association between that data type and a category of sensitive data. The (Continued)

device creates, based on the association for each of the plurality of data types, a protection binding that defines a data handling scope bonded to the association between that data type and its associated category of sensitive data. The device causes data compliance policies to be applied to the application according to its corresponding associations and protection bindings.

20 Claims, 7 Drawing Sheets

(56) References Cited

U.S. PATENT DOCUMENTS

| | | |
|---|---|---|
| 2018/0027022 A1 | 1/2018 | Nagaratnam et al. |
| 2018/0124066 A1 | 5/2018 | Minkovich et al. |
| 2018/0124113 A1 | 5/2018 | Lock et al. |
| 2018/0260566 A1 | 9/2018 | Chaganti et al. |
| 2019/0014123 A1 | 1/2019 | Akireddy et al. |
| 2019/0228171 A1 | 7/2019 | Mathur |
| 2020/0364351 A1 | 11/2020 | Sanchez et al. |
| 2021/0006972 A1 | 1/2021 | Guim Bernat et al. |
| 2021/0152561 A1 | 5/2021 | Shelton et al. |
| 2021/0286638 A1 | 9/2021 | Fan et al. |
| 2021/0329001 A1 | 10/2021 | Barton et al. |
| 2021/0360037 A1 | 11/2021 | Beckman et al. |

OTHER PUBLICATIONS

"Global Cloud Service Provider", online: https://us.ovhcloud.com/, accessed May 24, 2022, 11 pages.

"Google Distributed Cloud", online: https://cloud.google.com/distributed-cloud, accessed May 24, 2022, 8 pages.

Kurian, Thomas, "How Google Cloud is addressing the need for data sovereignty in Europe in 2020", online: https://cloud.google.com/blog/products/identity-security/how-google-cloud-is-addressing-data-sovereignty-in-europe-2020, accessed May 24, 2022, 2 pages.

"Gaia-X: A Federated Secure Data Infrastructure", online: https://www.gaia-x.eu/, accessed May 24, 2022, 6 pages.

"RegTech 100", online: https://fintech.global/regtech100/, accessed May 24, 2022, 14 pages.

"OneTrust Cloud Solutions", online: https://www.onetrust.com/, accessed May 24, 2022, 5 pages.

"Collibra—The Data Intelligence Cloud", online: https://www.collibra.com/us/en, accessed May 24, 2022, 4 pages.

"LogicGate Risk Cloud", online: https://www.logicgate.com/, accessed May 24, 2022, 5 pages.

"Governance and Security for Low-Code/No-Code Applications", online: https://www.zenity.io//, accessed May 24, 2022, 6 pages.

Zacks, et al., "Network Data Objectivization, Classification, Verification and Privacy via Ring-Oriented Metadata", Defensive Publication Series, Jul. 2021, 11 pages, Technical Disclosure Commons.

* cited by examiner

DATA COMPLIANCE BASED ON AUTOMATED ANNOTATIONS AND PROTECTION BINDINGS

TECHNICAL FIELD

The present disclosure relates generally to computer networks, and, more particularly, to data compliance based on automated annotations and protection bindings.

BACKGROUND

Applications operate by handling data. For instance, executing an application can involve the storage, communication, processing, etc. of various types of data. The various types of data may include data whose handling is subject to various regulations. For example, data handling regulations at national, federal, state, industry, and/or organizational levels may be applicable to the data handled by an application.

Data compliance has, thus far, been an afterthought during the application development lifecycle. Given the amount of data compliance regulations, their scope, and complexity, software developers and/or vendors are neither expected to have knowledge, nor to programmatically deal with, the intricacies of specific data regulations when developing an application. As such, data compliance is addressed without programmatic guidance from those with the knowledge of the types of data handled by the application and the regulations applicable thereto. Instead, data compliance is only being considered at deployment time and generally involves post hoc supervision of data handling. However, with violations of data compliance regulations increasingly resulting in substantial fines and penalties, the data compliance as an afterthought model is no longer viable.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
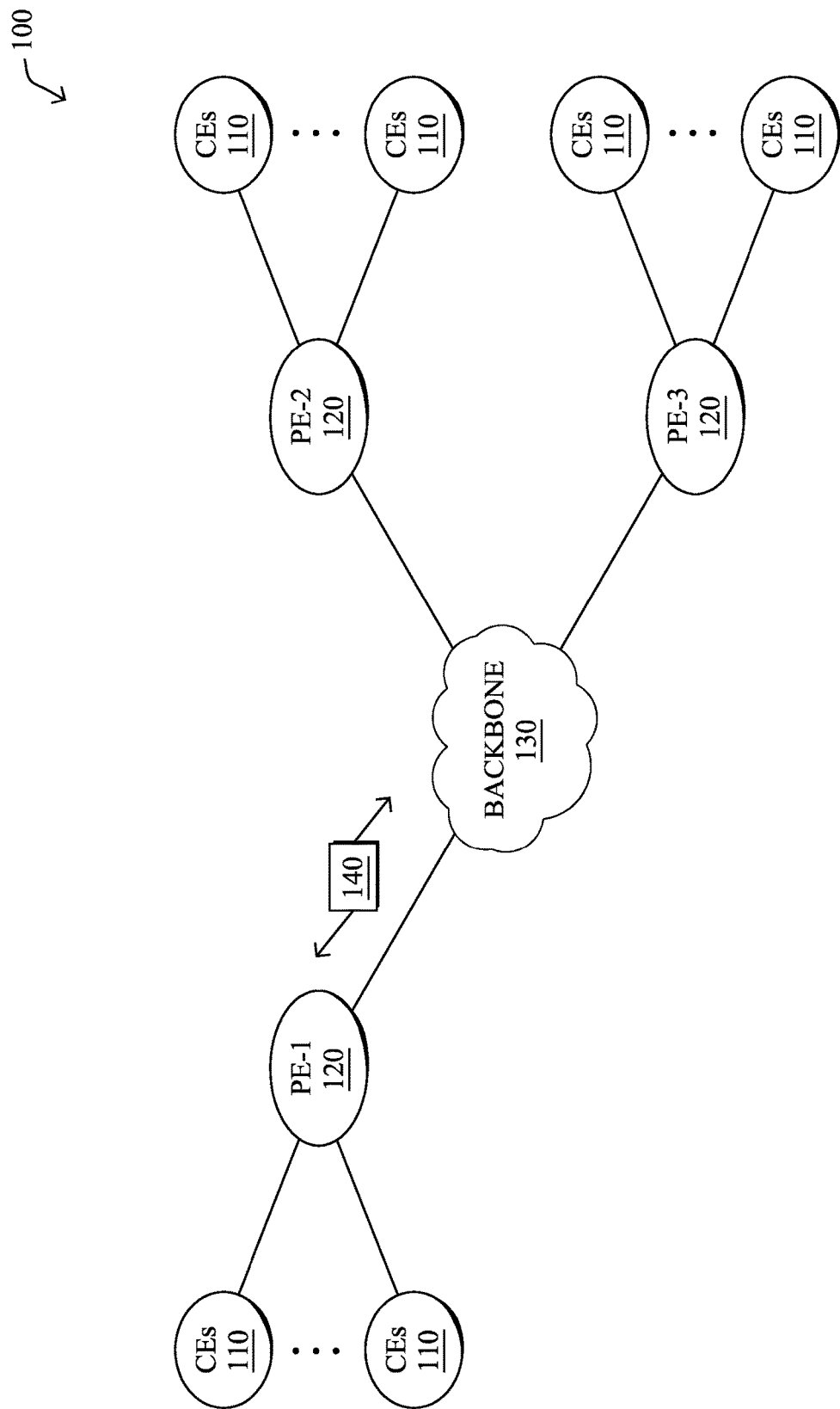
FIGS. 1A-1B illustrate an example communication network.

According to one or more embodiments of the disclosure, a device obtains program code of an application that defines annotations denoting a plurality of data types handled by the application. The device determines, for each of the plurality of data types, an association between that data type and a category of sensitive data. The device creates, based on the association for each of the plurality of data types, a protection binding that defines a data handling scope bonded to the association between that data type and its associated category of sensitive data. The device causes data compliance policies to be applied to the application according to its corresponding associations and protection bindings.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
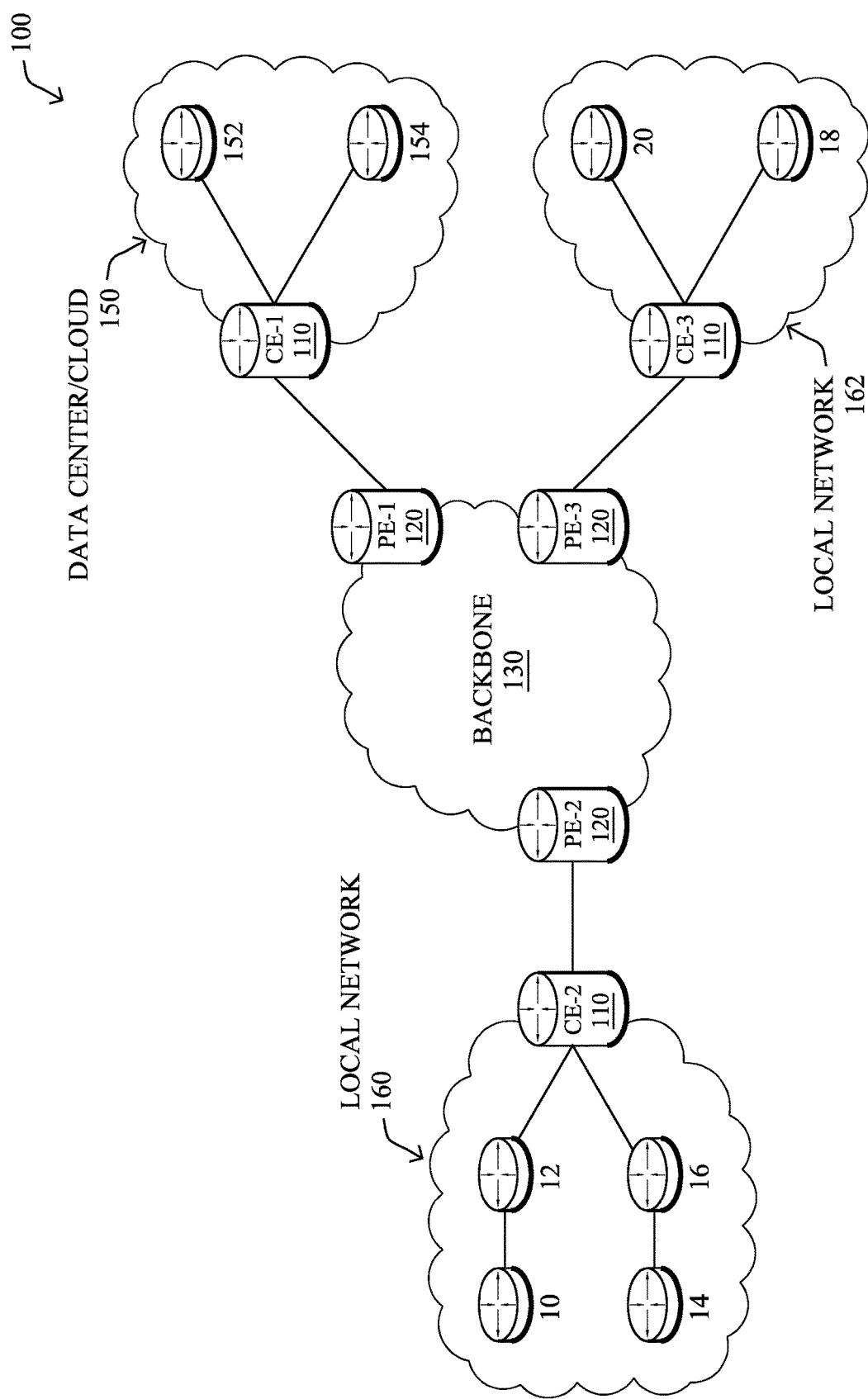

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
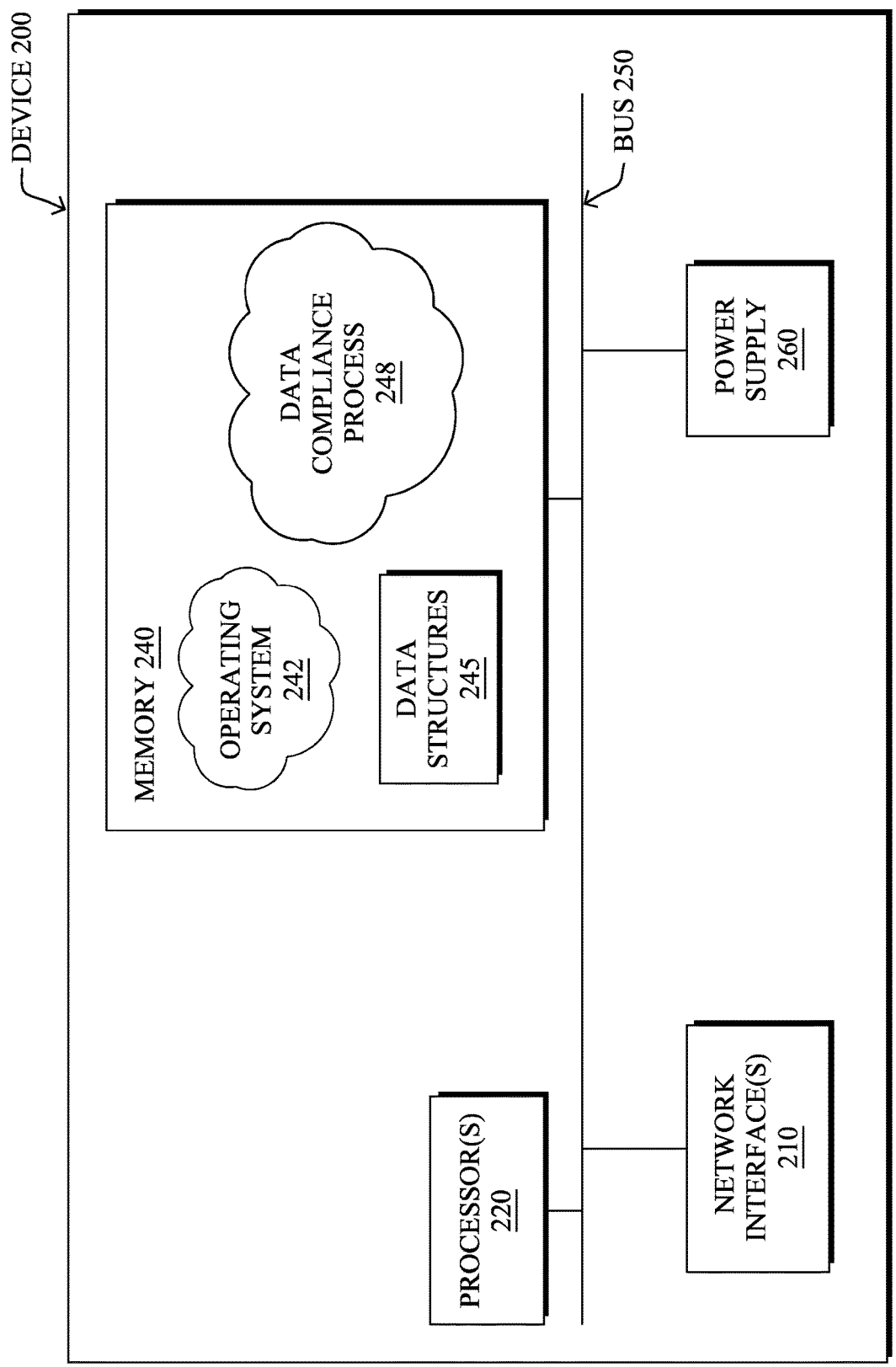
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250 and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise data compliance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, the number of laws, regulations, and rules regarding the storage and use of certain types of data are continually increasing across the globe. For instance, the General Data Protection Regulation (GDPR) in Europe places strict regulations on how a user's personal data is collected and shared. These and other regulations have spawned independent efforts across several countries to ensure that online applications comply with specific data regulations at national, federal, or state level, and particularly, those that are cloud-based. This acceleration in data sovereignty regulations is posing complex challenges to the organizations that use or manage that data, since legal obligations and constraints vary from country to country. The challenge is even greater since data compliance requirements are often not limited to data sovereignty obligations. For example, depending on the type of an application, data compliance may demand the amalgamation of other regulations, such as industry-specific regulation (e.g., complying with HIPAA obligations in the healthcare industry in the United States), or organization-specific rules (e.g., on how to deal with confidential data).

Currently, data compliance is largely only being considered at deployment time. For instance, a multinational company (e.g., the application user in this example) may rely on a third-party software vendor to develop an application. The application may need to be deployed and/or used in different countries (e.g., in Russia, Canada, the USA and the UAE). Application developers are neither expected to have knowledge, nor to programmatically deal with, the intricacies of specific data regulations in different regions. However, they do have knowledge on the kind of data being stored, accessed, exchanged, etc. by their application (e.g., through the APIs that they develop). Despite this, developers lack programmatic methods and tooling to facilitate the task of application users or managers to adhere to data compliance rules. This void in existing development, security, and operations (DevSecOps) pipelines and toolchains represents one of the biggest obstacles to planning, instrumenting, and meeting compliance regulations before, during, and after an application is deployed. As a result, data compliance is a problem that is addressed today without programmatic guidance from the organization that knows the most about the application workloads and their corresponding data, that is, the application developer.

Data Compliance Based on Automated Annotations and Protection Bindings

The techniques herein introduce a mechanism to allow for different types of data to be tagged during application development. In turn, a compliance engine may use these annotations to ensure that the application complies with all data sovereignty-related laws and other compliance regulations for the data.

Illustratively, the techniques described herein may be performed by hardware, software, and/or firmware, such as in accordance with data compliance process 248, which may include computer executable instructions executed by the processor 220 (or independent processor of interfaces 210) to perform functions relating to the techniques described herein.

Specifically, according to various embodiments, a device obtains program code of an application that defines annotations denoting a plurality of data types handled by the application. The device determines, for each of the plurality of data types, an association between that data type and a category of sensitive data. The device creates, based on the association for each of the plurality of data types, a protection binding that defines a data handling scope bonded to the association between that data type and its associated category of sensitive data. The device causes data compliance policies to be applied to the application at deploy time and at run time according to its corresponding associations and protection bindings.

Figure 3:
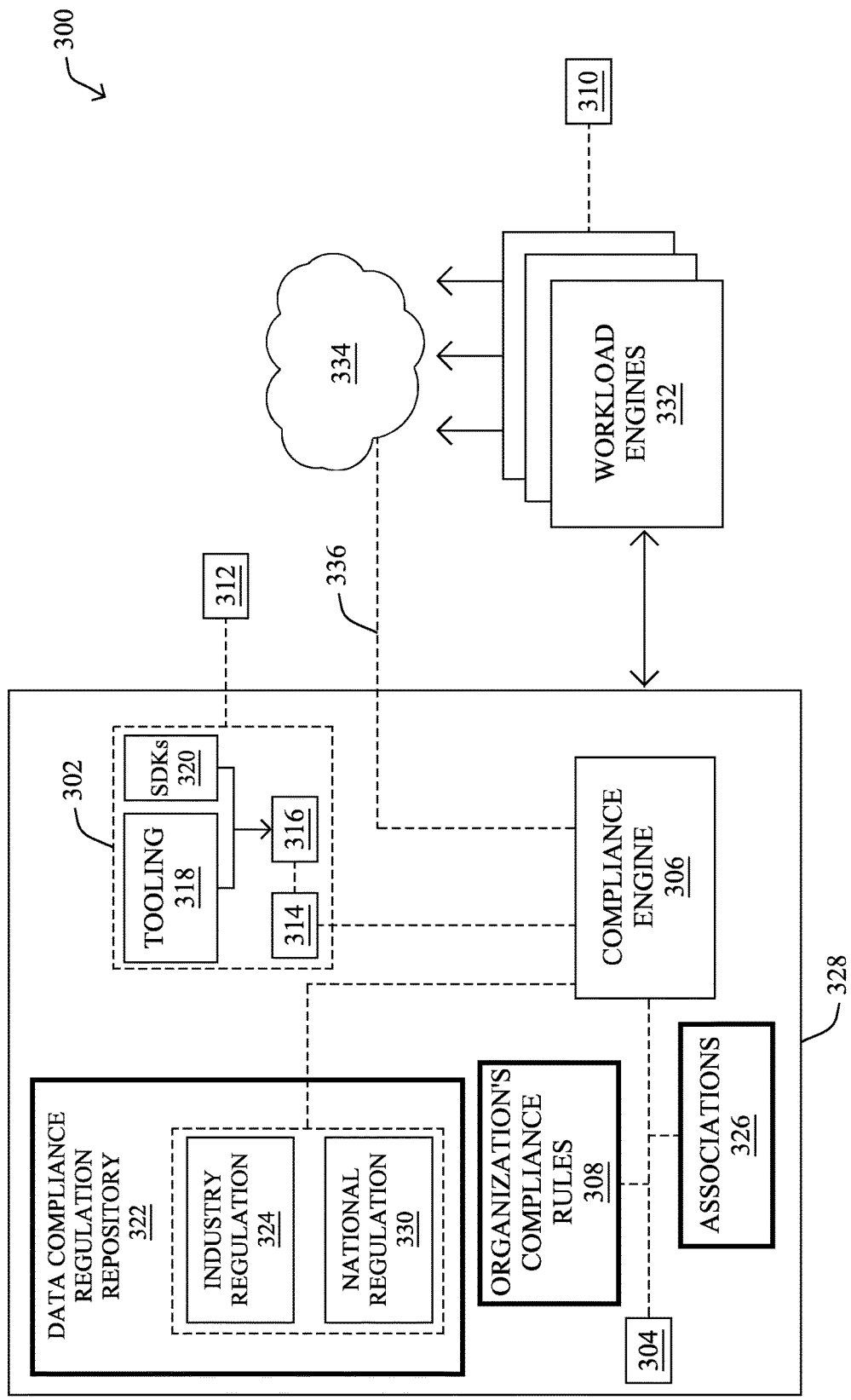
FIG. 3 illustrates an example architecture for data compliance.

Operationally, FIG. 3 illustrates an example architecture 300 for data compliance, according to various embodiments. The architecture 300 may include a data compliance process 328. Data compliance process 328 may be utilized to provide configuration, observability, and enforcement of data compliance rules. Data compliance process 328 may accomplish these functions utilizing Data Compliance as Code (DCaC).

DCaC may include integrating a data compliance mechanism into the program code of the application. For example, data compliance process 328 may be utilized to build data compliance into the application development process, supported by automated code annotations, bindings between such annotations and categories of sensitive data, and controls at code, build, and pre-deploy time. Data compliance process 328 may provide a mechanism whereby application developers proactively assist data teams, application managers, and legal departments with data compliance, while ensuring that developers may remain oblivious to specific regulations, data related obligations, or compliance requirements that organizations might have across different regions.

For example, data compliance process 328 may include data annotating process 302. Data annotating process 302 may facilitate application developers 312 automatically adding metadata to program code of an application 316 during the development of the application 316. In various embodiments, this may be performed by automated annotations of data fields in the program code and by the creation of references to such annotations at code-build time. These references to annotated code may be automatically rendered in the form of machine-readable data manifest 314.

More specifically, data annotating process 302 may provide a mechanism for automated annotations of the program code of application 316, including classes, application programming interfaces (APIs), and the resulting data at code/build time (e.g., by implementing a Low-Code/No-Code approach supported by software development kits (SDKs) 320 and tooling 318). Application developers may utilize SDKs 320 and tooling 318 to automatically label data topics, data producers, data consumers, data processors, data holders, etc. For instance, developers may label certain data by annotating it with a data type identifier. For example, a developer may annotate certain data as "protected-type-1," or other data as "protected-type-2," and so on.

SDKs 320 in data annotating process 302 may provide a set of predefined data types out-of-the-box, including associations by default to specific categories of sensitive data. Sensitive data may include a type of data that may be considered personal, private, sensitive, confidential, protected, secret, restricted, personally identifiable information (PII), etc. In some examples, sensitive data may include data that is subject to regulation. For example, Table 1 lists examples of predefined protected data types and default associations to some examples of categories of sensitive data.

TABLE 1

| PROTECTED DATA TYPE | DEFAULT ASSOCIATION |
| --- | --- |
| protected-type-1 | Customer PII |
| protected-type-2 | Employee PII |
| ... | ... |
| protected-type-23 | Patient Analysis Results |
| ... | ... |
| protected-type-41 | Sales Confidential |
| ... | ... |
| protected-type-56 | Restricted HR |
| ... | ... |
| unprotected | NA |

A list of the associations, such as the example illustrated in Table 1, may provide associations by default to several categories of sensitive data, including but not limited to PII, confidential, restricted, and unprotected data. In some embodiments, the set of predefined protected data types might be standardized or rely on an existing taxonomy.

SDKs 320 in data annotating process 302 may also provide a mechanism to define and use custom data types in annotating program data of the application 316. For example, custom data types may be utilized, which identify protected data types that are not covered by any of those available by default in SDKs 320. For example, "custom-type-1" might be a custom data type associated to a category of sensitive data such as "Restricted Employee Poll." In various embodiments, the generation and/or insertion of the annotations into the program code of the application 316 may be accomplished by an automated process (e.g., a programmatic identification of data of a particular data type triggering an automated insertion of an annotation of the data as the particular data type, etc.), a partially automated process (e.g., a programmatic flagging of data of a particular data type with a supervised or manual annotation of the data as the particular data type, etc.), and/or a manual process (e.g., a manual flagging of data of a particular data type and/or a manual annotation of the data as the particular data type, etc.).

In various embodiments, associations between protected data types and categories of sensitive data may be assigned and/or instrumented by different organizations and at different moments in time. In some cases, the association between protected data types and categories of sensitive data may be assigned by application developers 312 at code/build time. This might be the case when the team of application developers 312 is part of, or develops for, the organization that may use or manage the application 316. In such cases, the team of application developers 312 might have sufficient knowledge about the data and their use, so that they may either use the associations provided by default or create custom ones.

In additional instances, application developers 312 of application 316 and/or the users of the application 316 might belong to different organizations. For example, this may be the case when application developers 312 are a DevSecOps team that develops an application 316 that may be used across different organizations, industries, etc. In such cases, application developers 312 may be unaware of the categories of data that should be assigned by a data team and/or application managers 304 in another organization (e.g., precisely what data is confidential and what data is not with respect to that organization and its use of the application 316). In these instances, application developers 312 may leverage SDKs 320 and tooling 318 to approach data labeling and association in a manner that sidesteps the knowledge deficit while still instilling the functionality. For example, the application developers 312 may leverage SDKs 320 and tooling 318 to automatically add the different classes of protected data type at code build time (e.g., utilizing predefined and custom protected data types). Additionally, or alternatively, the application developers 312 may leverage SDKs 320 and tooling 318 to automatically insert references in the form of machine-readable descriptions for the protected data types that may be used to generate data manifest 314 bound to application 316 at build time.

The protected data type annotations and their corresponding references may be utilized by a data team and/or application managers 304 in another organization to select and/or create automated associations 326 between categories of annotated data in the application 316 (e.g., metadata provided by application developers 312) and specific categories of sensitive data (e.g., personal data, private data, sensitive data, confidential data, protected data, secret data, restricted data, PII, etc.). For instance, each protected data type might be bonded to a class of tokens (e.g., JSON Web Tokens with a specific scope), which in turn might represent different categories of sensitive data for a data team and/or application managers 304.

In a specific example, an API call for application 316 may be labeled by application developers 312 with a data type identifier such as "custom-type-7" at code/build time. The "custom-type-7" labeled API call may attempt to access certain data using its bound token (e.g., "Token 7") with a scope defined by, for example, a data team and/or application managers 304 before application 316 was deployed. From the data team and/or application managers 304 perspective, the attempt to access this data may translate to a request to access, for instance, "Confidential Partner" data. As such, the data type labels, and their associations may be utilized as an automated data mapping between the programmatic operations of application 316 and the sensitive data implicated in those operations. In various embodiments, these associations and functionalities may be supported by compliance engine 306 based on the selection, configuration, and automation of data compliance rules before application 316 is deployed and/or post-deployment.

In some examples, application developers 312, which again may be a DevSecOps team, might opt for a hybrid approach to generating these associations. For example, this may be the case when making some custom associations between data types and categories of sensitive data or using those predefined in the system (e.g., "protected-type-1" to "Customer PII") might not only be trivial for the application developers 312 but also may facilitate the task of a data team and/or application managers 304 in defining associations. However, other associations might not be apparent to application developers 312. Hence, certain data in application 316 may be labeled as "protected types" along with their corresponding machine-readable descriptions in data manifest 314, though they may remain unassigned to a specific category of sensitive data, so they can be associated later by a data team and/or application managers 304 before the application is deployed, or by an automated data lineage, classification, and tagging process at run time (e.g., during the testing phase, that is, before the application is deployed in production).

In some embodiments, a data team and/or application managers 304 may be provided with a mechanism to change the associations created by application developers 312 or even associate more than one category of sensitive data to a given data type (e.g., a data team and/or application managers 304 may associate certain data with both "Employee PII" and "Confidential Data"). Hence, two categories of data compliance policies (e.g., one for "Employee PII" and another for "Confidential Data") may apply and restrict even further the access to this category of data. In general, a data team and/or application managers 304 may be able to Create, Read, Update, or Delete (CRUD) any association between the metadata provided by application developers 312 and categories of sensitive data.

In various embodiments, a data team and/or application managers 304 may proactively create a set of custom data types. A data team and/or application managers 304 may provide the set of custom data types to application developers 312. Application developers 312 may then utilize the set of custom data types so that application 316 is annotated at development based on guidelines (e.g., the set of custom data types, etc.) provided beforehand by the data team and/or application managers 304.

In additional embodiments, application developers 312 and a data team and/or application managers 304 may collaborate to annotate application 316. For example, application developers 312 and a data team and/or application managers 304 may iterate in the annotation and association processing in an agile manner. For example, the iteration may be performed as part of a continuous integration/continuous delivery (CI/CD) pipeline (e.g., at testing, staging, and production).

In some examples, application 316 may be composed of several services developed with different programming languages. Therefore, application 316 may utilize different SDKs 320. In some instances, the annotation methods and terminology applied to application 316 may vary depending on the programming language (e.g., usually referred to as attributes in C#, decorators in Python, annotations in Golang, etc.). In such cases, tooling 318 of data annotating process 302 may examine the different predefined and custom data types used with different SDKs 320, perform checks, and ensure consistency in the annotations and enumeration across the different services at build time. For example, these consistency checks may ensure that a given "custom-type-X" data type identifier represents the same type of data across services programmed using different programming languages even if they were programmed by different developers. Overall, the data annotating process 302 may provide different degrees of freedom to application developers 312, data teams and/or application managers 304, and the number of protected data types used, and their corresponding associations may vary depending on the type of application 316.

Data annotating process 302 may, as described above, be utilized in generating automated data references. Specifically, data annotating process 302 may automatically render a data manifest 314 bonded to application 316 at build time. Data manifest 314 may provide machine-readable descriptions of the predefined and/or custom data types used by application 316. A combination of SDKs 320 and tooling 318 may facilitate the instrumentation and automation of the program code at build time, including the automated rendering of data manifest 314. In some cases, application 316 may be composed of various containers. Each container may be built and packaged with its own data manifest, such that the final data manifest rendered for application 316 may be a composition of the individual data manifests. In some cases, application 316 may include dependencies on external services, such as a MySQL database. Such dependencies may be captured as a dependency manifest. Data fed, processed, retained, or retrieved from these external services may also be annotated and automatically captured in application 316 data manifest 314.

Data annotating process 302 may, as described above, be utilized for decoupling data compliance from the business logic of application 316. For example, SDKs 320 and tooling 318 of data annotating process 302 may provide automated mechanisms for decoupling the configuration, observability, and enforcement of data compliance rules from the business logic of application 316. In some instances, application 316 may be a cloud/edge native application, which may be implemented as a set of workloads composing a service mesh. The decoupling of data compliance from the business logic may be especially relevant for applications of this type, as geographically dispersed and/or variably deployed workloads may implicate increased data compliance complexity.

Various possible embodiments for decoupling data compliance from the business logic of application 316 may be utilized. For instance, a sidecar model, where the services that implement the business logic of application 316 are deployed together with sidecar proxies associated to each of those services, may be utilized. The sidecar proxies may be utilized to enforce horizontal functions that are independent of the business logic, such as routing, security, load balancing, telemetry, retries, etc. As such, the sidecars may be well-positioned to decouple, observe, and control data compliance. For example, a combination of distributed data compliance controllers and sidecar proxies may be used to configure, observe, and enforce data compliance rules across different geographies, and distributed multi-cloud and edge infrastructures 334.

Instead of, or in addition to, using sidecars, various embodiments may use client libraries, daemons working in tandem with the application-specific services, or sandboxed programs in the OS kernel, e.g., using the Extended Berkeley Packet Filter (eBPF). Further embodiments may use an agentless approach or embed such functionality in Kubernetes itself. In any case, the functionality introduced herein may enable the portability and reuse of observability and enforcement of data compliance functions across not only different applications but also cloud and edge environments.

The above-described data annotating process 302 may yield a portable application 316 that is geared with built-in annotations for different types of protected data. In addition, the yielded application 316 may be structured to operate while remaining agnostic of any state, country, industry, organization-specific regulation and/or data policy requirements that a data team and/or application managers 304 might have. As a result, data annotating process 302 may be leveraged as a new model of building applications including DCaC by not only data teams and/or application managers 304, but also software as a service (SaaS) providers and others.

Data compliance process 328 may provide configuration, observability, and enforcement of data compliance rules. As described above, associations 326 between categories of annotated data in application 316 and specific categories of sensitive data may be instrumented prior to a deployment of application 316. The associations 326 may be used to control the processing and use of data during and after the deployment of application 316. More specifically, compliance engine 306 may utilize associations 326 together with current data compliance regulations governing data handling in each region where application 316 may be used, as well as specific organization compliance rules 308 for/while using application 316, to enforce compliance with them. Such controls may apply to data access requests, data storage and retention policies, data processing requirements, etc. of application 316 both at deploy and execution time, etc.

To this end, data compliance process 328 may include data compliance regulation repository 322. Data compliance regulation repository 322 may provide a repository of data compliance rules. For example, data compliance regulation repository 322 may include a repository of industry regulations 324 which may be applicable to the use of application 316. For example, with respect to instances where application 316 is used by a healthcare provider, data compliance regulation repository 322 may include industry regulations 324 such as Health Insurance Portability and Accountability Act of 1996 (HIPAA) regulations applicable to handling of data in the healthcare industry. In other examples, data compliance regulation repository 322 may include a repository of national regulations 330 which may be applicable to the use of application 316. For example, with respect to instances where application 316 is based in a member state of the E.U., data compliance regulation repository 322 may include national regulations 330 such as the GDPR applicable to handling of data in the E.U.

The data compliance regulations included in data compliance regulation repository 322 may be consumed by a data team and/or application managers 304 as a service (aaS). Data compliance regulation repository 322 may support input, expression, collection, approval, visualization, and/or use of data compliance policies covering multiple categories of rules. For example, data compliance regulation repository 322 may store data compliance policies that are specific to an industry, those that may apply at a national, multi-national, federal, state, and industry levels, etc. For instance, an organization (e.g., a multi-national company) may leverage a data compliance regulation repository 322 service of a data compliance process 328 and utilize the regulations already available in data compliance regulation repository 322, which may cover regulations across several industries and countries out-of-the-box. An organization may select the target state, country or region, the industry if needed, and select the data compliance regulations that may be applicable at the organizational level (e.g., organization's compliance rules 308).

Compliance engine 306 may offer APIs and a user-friendly user interface (UI) through which a data team and/or application managers 304 may select and define data compliance requirements. For instance, if application 316, which handles Customer PII data, needs to be deployed in British Columbia, Canada, a data team and/or application managers 304 may simply select "Customer PII→Apply Local Regulation" to constrain the processing, storage, retention, and access to Customer PII data according to the regulations in British Columbia as retrieved from data compliance regulation repository 322. To this end, compliance engine 306 may compute and handle the resulting constraints that apply to Customer PII data in British Columbia transparently to data team and/or application managers 304. More specifically, the set of data compliance constraints may be captured in a machine-readable format from data compliance regulation repository 322, and therefore, used by compliance engine 306 programmatically.

In some examples, compliance engine 306 may be utilized as a pluggable module working in tandem with one or more workload engines 332, such as Cisco Intersight or any automation tool offered by a hyperscaler, or other cloud and edge providers. Workload engines 332 may manage the deployment of application 316, subject to the rules and constraints provided by compliance engine 306.

In various embodiments, compliance engine 306 may operate either in a push or a pull model. For instance, in a pull model, a workload engine 332 may receive a request to deploy application 316 in a given region (e.g., a request from a site reliability engineering (SRE) and/or information technology (IT) team member 310). In such a case, workload engine 332 may issue a request to compliance engine 306, to compute and return data compliance rules and constraints that must be applied for their specific deployment. Alternatively, in a push model, a data team and/or application managers 304 may select the compliance rules required and a declarative intent for application deployment may be issued from compliance engine 306 to one or more workload engines 332. Such deployments may involve multi-cluster service meshes, which may run across multi-cloud and edge infrastructures 334. In various embodiments, the above-described sidecar proxies in the service mesh may not only provide monitoring and observability of data compliance to compliance engine 306 but also may receive configuration and compliance updates in real-time 336. In additional embodiments, the same functionality may be implemented utilizing client libraries, daemons, eBPF, an agentless approach, or Kubernetes itself. In addition, some embodiments may support the techniques described herein without utilizing a service mesh.

Figure 4A:
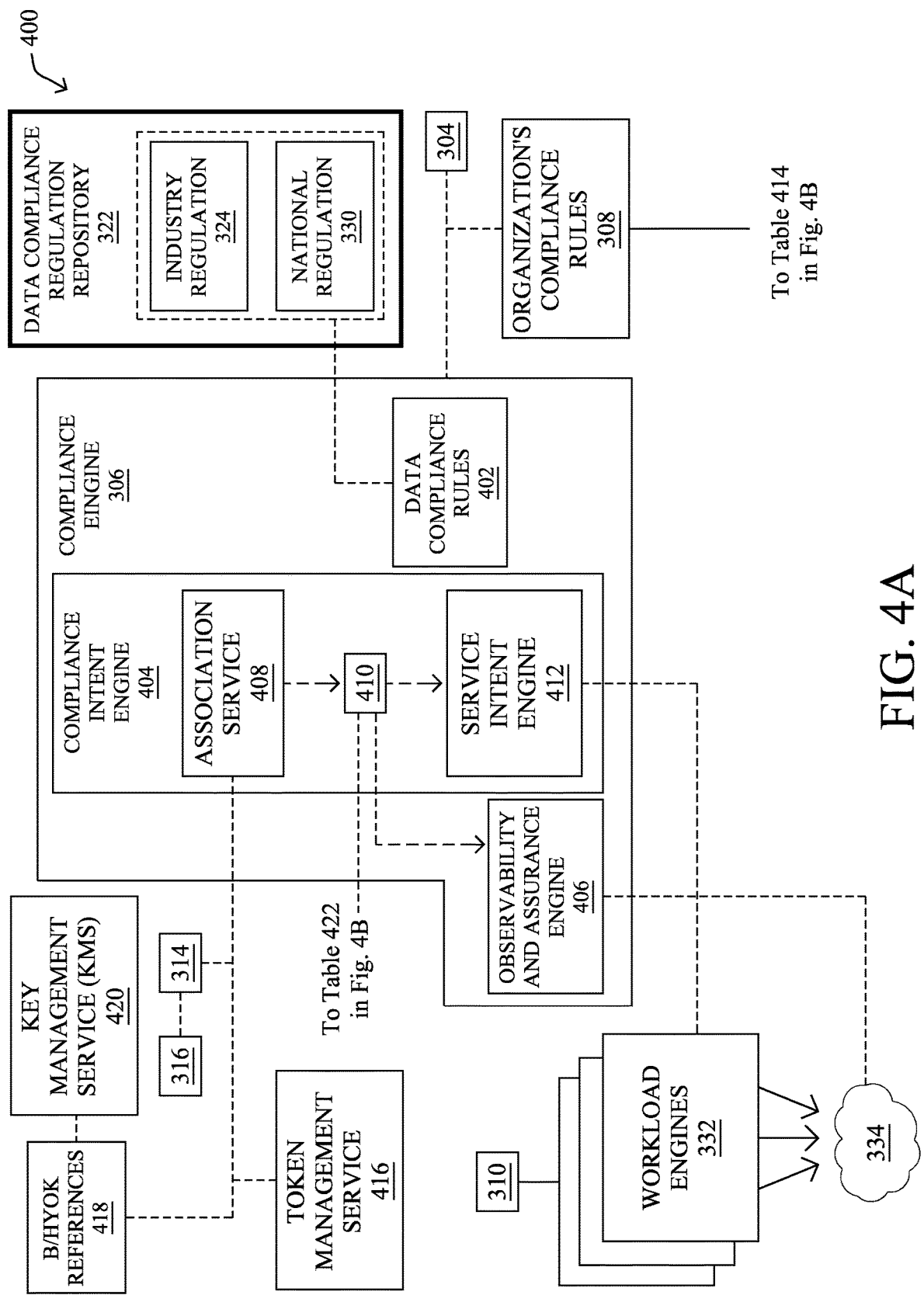
FIGS. 4A-4B illustrate an example architecture for data compliance and protection bindings.
Figure 4B:
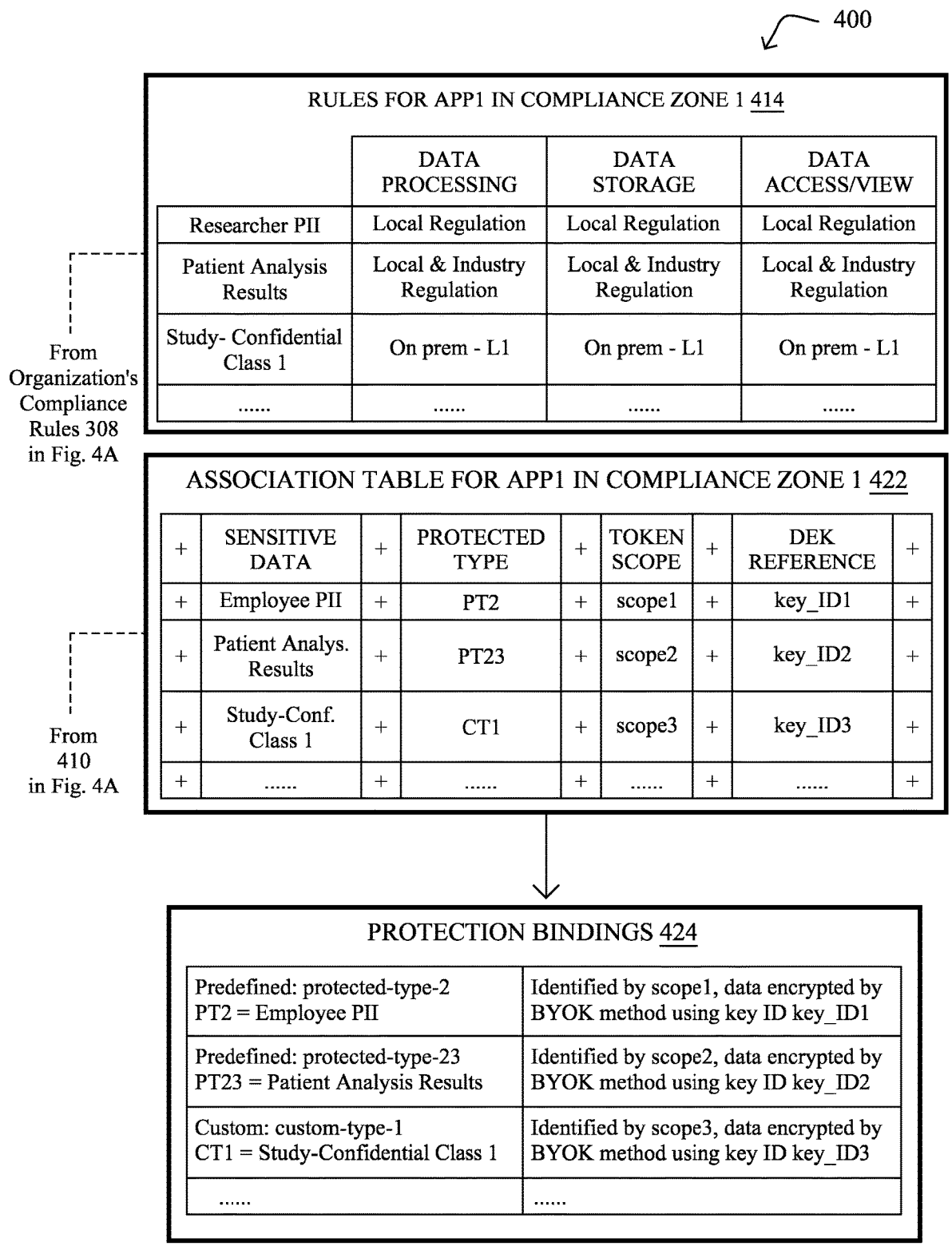

FIGS. 4A-4B illustrate an example architecture 400 for data compliance and protection bindings according to various embodiments. Architecture 400 may be utilized to deliver DCaC. For example, architecture 400 may include compliance engine 306. Compliance engine 306 may include data compliance rules module 402, compliance intent engine 404, and/or observability and assurance engine 406.

Data compliance rules module 402 may compute compliance constraints based on a combination of inputs. For example, the constraints may be computed based on a combination of inputs including the target state, country, or multi-country region for an application, the industry the application is being utilized within, and/or the compliance rules required by an organization using the application.

Compliance intent engine 404 may include an association service 408. Association service 408 may manage a set of association tables 410. Association service 408 may include functionality to allow a data team and/or application managers 304 to select, configure, and create the associations (e.g., associations 326 from FIG. 3) and store them in the form of protection bindings 424 in association tables 410 (e.g., populated association table 422 and its associated protection bindings 424 provide a non-limiting specific example of one such association table). The protection bindings 424 may define a data handling scope bonded to the association between a data type and its associated category of sensitive data. The data handling scope may be an indication of how data will be handled by the application (e.g., applicable tokens, token scopes, encryption keys, etc.). The protection bindings 424, stored in populated association table 422 may be created and/or maintained by compliance engine 306. The protection bindings 424 may not be reinserted into the program code but rather maintained by compliance engine 306 since protection bindings 424 may be subject to changes over time (e.g., the scopes might change, encryption keys may be rotated, etc.) and keeping the protection bindings 424 outside of the program code may prevent these changes from affecting the program code.

Additionally, compliance intent engine 404 may include a service intent engine 412. Service intent engine 412 may interface with workload engines 332. Service intent engine 412 may either receive and/or process data compliance requests from workload engines 332 (e.g., pull model) or create and/or issue declarative intents encoding a deployment request to workload engines 332 (e.g., push model).

Observability and assurance engine 406 may receive telemetry data from services deployed in the field (e.g., from a service mesh deployed across multi-cloud and edge infrastructures 334). In addition, observability and assurance engine 406 may push data compliance configurations and data traffic filters in real-time 336 out to workloads deployed in the multi-cloud and edge infrastructures 334.

To populate association tables 410 and create protection bindings 424, association service 408 may obtain inputs defining the associations of the protected data types and/or their data handling scopes. For example, for each annotated application 316, association service 408 may obtain data manifests 314 describing the set of predefined and custom protected data types handled by annotated applications 316 and potential associations already made by application developers (e.g., application developer 312 in FIG. 3).

Additionally, association service 408 may obtain data handling scopes to be bonded to individual associations between given data types and their associated category of sensitive data. For example, association service 408 may obtain, as an input, categories of tokens and corresponding scopes that may be associated with each of the protected data types used in the annotated classes and methods that compose the annotated application 316. Such tokens may be defined and/or obtained from external token management service 416 (e.g., from OKTA).

Further, association service 408 may obtain, as an input, identifiers of encryption keys. The encryption keys may be those keys associated with each of the protected data types used in the annotated classes and methods that compose annotated applications 316. For example, different categories of sensitive data may be encrypted utilizing techniques such as bring your own key (BYOK) or hold your own key (HYOK). The encryption key identifiers (ID) may be defined or obtained from external encryption key service 418, which may extract encryption key IDs. External encryption key service 418 may interface with key management service (KMS) 420 and may create references (e.g., key IDs) to encryption keys stored and managed by KMS 420. In this manner, the keys may not be managed by association service 408, but instead may remain secure with KMS 420.

This set of inputs may be utilized by association service 408 to populate association tables 410. In some examples, there may be one association table populated per annotated application 316 and/or per data compliance zone (e.g., a geographical area where the application is deployed, etc.). A populated association table 422 may include the automatically associated annotated data types (e.g., protected data type labels), with categories of sensitive data (e.g., encoded in the form of tokens with specific scopes as illustrated in populated association table 422), along with pointers to the encryption keys used for each category of protected data (e.g., key IDs).

Compliance engine 306 may handle one populated association table 422 per compliance zone for each annotated application 316. In some embodiments, populated association table 422 may be extended to include columns denoting API paths to access the data resources. In some cases, the paths may explicitly embed the protected data types used by the application developers. In addition, the tokens, scopes, and key IDs may be renewed and dynamically updated in populated association table 422 depending on their validity and/or expiration time. Populated association table 422 may also manage more advanced associations, including m:n bindings (e.g., two or more protected data types might be associated to a single token/scope class).

Once association tables 410 are defined and/or populated, data team and/or application managers 304 may select the organization's compliance rules 308. Organization's compliance rules 308 may include data compliance rules (e.g., data compliance rules 414) selected to be required for a specific annotated application 316 (e.g., "App 1") that should be deployed in a specific geographical region (e.g., "Compliance Zone 1").

For example, data compliance rules 414 may include constraints selected to be applied to each category of sensitive data (e.g., "Researcher PII," "Patient Analysis Results," "Study-Confidential Class 1," etc.) within annotated application 316 "App 1". Data compliance rules 414 may further specify the selected constraints associated with processing the category of sensitive data, storage and retention of the category of sensitive data, and/or accessing or viewing of the category of sensitive data by the annotated application 316.

Data compliance rules 414 may be rules that may apply to a new annotated application 316 (e.g., "App 1"). In this example, application "App 1" may handle data about clinical trials of a new drug developed by a pharmaceutical company. Application "App 1" may collect and analyze data and provide insights about the new drug. In this example, the application "App 1" may support several categories of sensitive data.

For example, the application "App 1" may support the category of sensitive data "Researcher PII" data, which may include PII of the employee conducting one of the trials. In this example, the rule chosen may be one to restrict the processing, storage, and access to the data according to a "local regulation." For example, if the compliance zone where the application is going to be deployed is British Columbia, Canada, then this rule automatically constrains the location of workloads, the storage, and any attempt to access or view such data according to the regulation on PII in British Columbia, Canada. If the trials were instead to be conducted in New Delhi, India, the rule might be the same (e.g., applying a local regulation), but the resulting constraints yielded by compliance engine 306 will usually differ from those in British Columbia, Canada by virtue of the two locations having different data handling regulations.

Application "App 1" may also support the category of sensitive data "Patient Analysis Results" data. In this example, the rule chosen by a data team and/or application managers 304 may adhere to both the local and industry-specific regulation. In the examples of application "App 1," the industry-specific regulation may include, for example, specific legislation constraining the processing, storage, and access to patients' data with respect to clinical trials.

Application "App 1" may additionally support the category of sensitive data "Study-Confidential Class 1" data. This data type may be a custom protected data type that may be implemented to enable researchers to keep a specific category of data related to the clinical trials as highly confidential. In this example, the processing, retention, and access to the data may be constrained to a specific facility. For example, perhaps the processing, storage, and access of the "Study-Confidential Class 1" data is constrained to the premises of a "Laboratory 1" associated with the clinical trial (e.g., "On prem-L1").

Based on data compliance rules 414 input along with the corresponding protection bindings 424, data compliance rule module 402 may identify the implicated categories of sensitive data. For example, the three categories of sensitive data (e.g., "Employee PII," "Patient Analysis Results," and "Study-Confidential Class 1") listed in data compliance rules 414, along with corresponding protection bindings 424 in populated association table 422 may be identified by data compliance rule module 402. These categories of sensitive data may be defined and/or used by a data team and/or application managers 304 and/or may have already been associated to specific predefined and custom protected data types, such as the ones shown in populated association table 422 and/or protection binding 424.

In addition, data compliance rule module 402 may identify the selected compliance requirements listed in data compliance rules 414. For example, data compliance rule module 402 may identify the compliance requirements specified for processing, storage, and access for each of the categories of sensitive data as defined in data compliance rules 414.

Data compliance rule module 402 may compute the set of compliance constraints that apply to application "App 1" based on data compliance rules 414 and/or a compliance zone selected (e.g., a target country and industry for "App 1"). In some examples, the set of compliance constraints may be computed from, for example, industry regulations 324, national regulations 330, etc. obtained from data compliance regulation repository 322.

The output of data compliance rule module 402 (e.g., the computed set of compliance constraints for a category of sensitive data) may be processed by compliance intent engine 404. Compliance intent engine 404 may link the resulting constraints to the corresponding populated association table 422 and send this output to both observability and assurance engine 406 and service intent engine 412. As such, the compliance constraints may be linked to categories of sensitive data and/or their associated protected data types in the program code. Therefore, the compliance constraints may be linked to individual portions of the application code. For instance, the constraints may be linked to control a data transfer through an API call that was previously annotated by application developers 312 using the protected data types referenced in protection bindings 424, populated in association table 422, and constrained by data compliance rule module 402 according to data compliance rules 414.

In various embodiments, once a service mesh is deployed, a data consumer process may request access to a data resource through an API. This may be implemented using a GET method including a path containing the field "custom-type-1" (CT1), which, according to population association table 422, represents the custom protected type "Study-Confidential Class 1". The HTTP request may be transported and forwarded over mTLS across the sidecar proxies in the service mesh. The authorization header in the service mesh may carry "token 3" with a specific scope "scope 3," as defined in populated association table 422. In this example, "scope 3" represents the category of sensitive data "Study-Confidential Class 1," and the constraint in this case is that the data of that type must be retained on "prem Lab1." To that end, service intent engine 412 may have requested and/or instructed a workload engine 332 to deploy the workloads handling "CT1" "on prem L1." In turn, observability and assurance engine 406 may have configured data filters in the sidecar proxies to enforce access control. For instance, API calls using an authorization token with "scope 3" may be restricted to data consumers located "on prem L1."

Compliance engine 306 may process more elaborate data compliance rules than simply those illustrated, including the selection of specific locations for processing, storage, retention, and access for each category of sensitive data. For instance, a data team and/or application managers 304 may choose a specific data center (e.g., where their data warehouse is hosted), a compliant public or edge zone, a compliant private cloud or edge site, combinations of these, etc. While some of these selections may be very specific, others might remain openly declarative, which an SRE/IT member 310 may translate into a specific infrastructure request for deploying the application, or some of the services that comprise the application.

Some of the tokenization mechanisms described herein may be externally handled, such as by an authorization server, which may potentially work in concert with a delegated authorization solution (e.g., OAuth 2.0/OpenID Connect), a single sign-on (SSO) solution, etc. In such scenarios, the specific categories of tokens and scopes references in association tables 410 may be obtained from external systems.

In addition to the tokenization mechanisms, a data team and/or application managers 304 may also select the user and/or process groups that may have access to the different categories of sensitive data (e.g., read only, read and write, or no access). Such groups may be managed using internal tools or they may be externally handled by an authorization service (e.g., OKTA). In some embodiments, the selection of token scopes and the access rights applied to user and/or process groups may be made jointly. These additional constraints may also be part of the data compliance rules and state maintained by data compliance rule module 402.

In another embodiment, compliance engine 306 may also enable the use of third-party annotations and/or data catalogs (e.g., imported from external data classification and tagging systems, such as from Collibra, OneTrust, or others). In such cases, the protected types used in protection bindings 424, and populated in association table 422, may be comprised of a set of annotation labels (i.e., metadata) added by application developers 312 (e.g., PT2, PT23 and CT1 in FIGS. 4A-4B) as well as third-party labels provided by external systems.

As such, DCaC implemented through architecture 400 may provide two levels of decoupling. First, a decoupling between the annotations or metadata embedded in the program code of the application as provided by application developers 312 at code/build time and the categories of sensitive data that may be selected and associated by a data team and/or application managers 304 before the annotated application 316 is deployed. Second, a decoupling between the categories of sensitive data and the rules selected by a data team and/or application managers 304, and the specific data compliance regulation and data compliance constraint that may apply to a given industry and/or region.

Such an approach may facilitate application developers 312 proactively assisting a data team and/or application managers 304, while all of them are allowed to remain oblivious to the specificities and intricacies of the different data compliance regulations across the different industries and regions.

Figure 5:
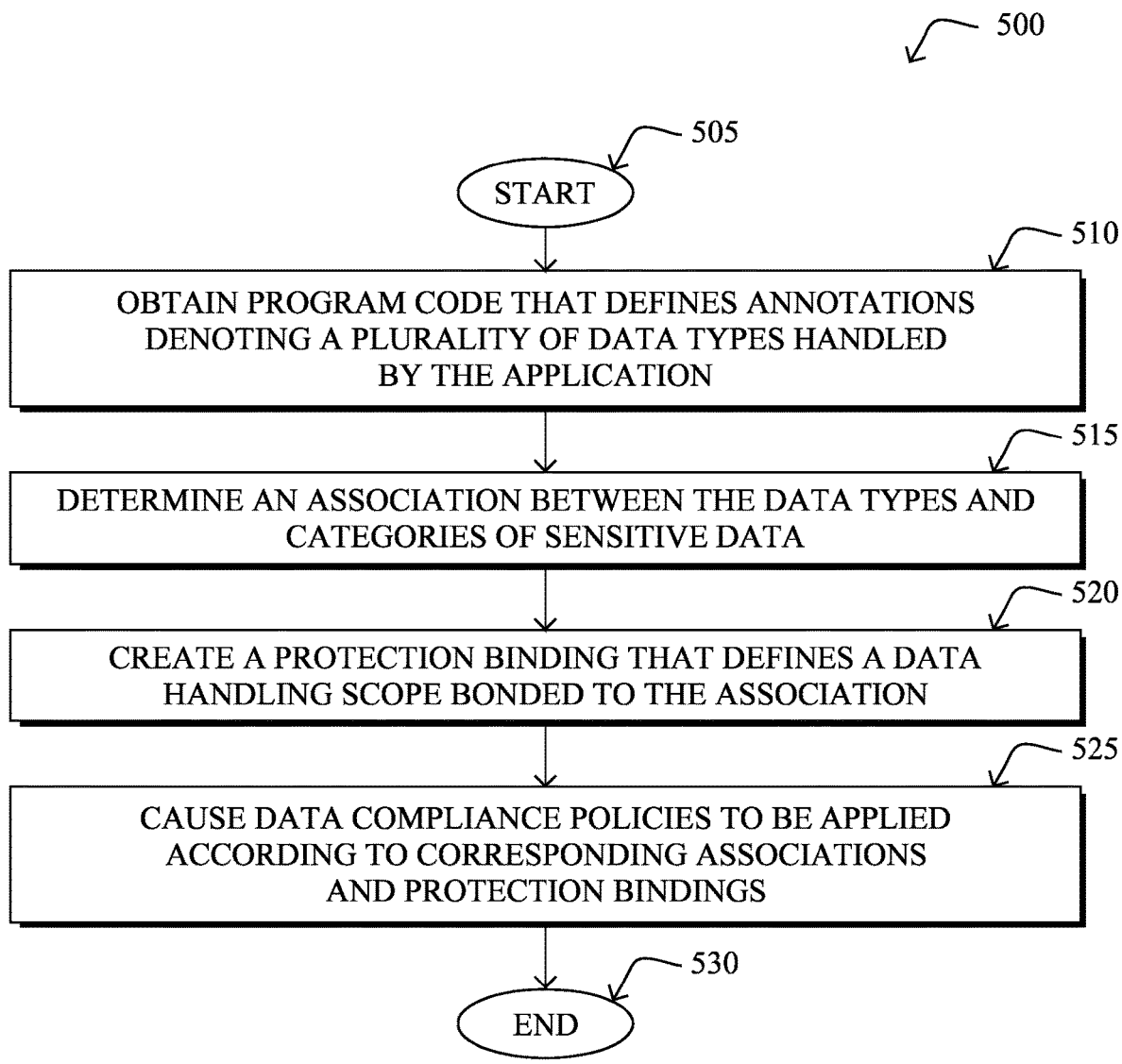
FIG. 5 illustrates an example simplified procedure for data compliance.

FIG. 5 illustrates an example simplified procedure (e.g., a method) for data compliance based on automated annotations and protection bindings, in accordance with one or more embodiments described herein. For example, a non-generic, specifically configured device (e.g., device 200), may perform procedure 500 by executing stored instructions (e.g., data compliance process 248). The procedure 500 may start at step 505, and continues to step 510, where, as described in greater detail above, a device may obtain a program code of an application that defines annotations denoting a plurality of data types handled by the application.

At step 515, as detailed above, the device may determine, for each of the plurality of data types, an association between that data type and a category of sensitive data. The association may be defined by a programmer via a user interface or an application programming interface. A programmer may include an application developer, a data team member, and/or an application manager. In some examples, the device automatically infers the association from a corresponding annotation of the annotations in the program code. In addition, the device may associate a token having a predefined access scope with a particular category of sensitive data. Further, the device may associate a pointer to an encryption key with a particular category of sensitive data. In other examples, the device may also enable the association of user and/or process groups that may handle a particular category of sensitive data.

At step 520, the device may create, based on the association for each of the plurality of data types, a protection binding that defines a data handling scope bonded to the association between that data type and its associated category of sensitive data. The protection binding may indicate the association between a given data type and a given category of sensitive data.

At step 525, as detailed above, the device may cause data compliance policies to be applied to the application according to its corresponding associations and protection bindings. In various embodiments, the compliance policies may be applied to the application at deploy time and/or at run time. In some examples, at least one of the data compliance policies may control where a particular category of sensitive data is stored by the application. Additionally, at least one of the data compliance policies may control how a particular category of sensitive data is accessed or processed by the application. Further, at least one of the data compliance policies may control where a workload of the application that is associated with a particular category of sensitive data is executed. The device may automatically generate data compliance constraints based on a type of the application or where the application will be deployed. In various embodiments, the device may automatically generate the data compliance constraints based on a repository of industrial regulations, governmental regulations, or organizational regulations. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a DCaC system into application development, deployment, and operation. DCaC may simplify data compliance tasks in a manner that is scalable and capable to adapt to changing laws and other data sovereignty requirements. With DCaC, data compliance instrumentation may be built into the system, providing a future-proof approach as organizations can quickly adjust to any ruleset, today and in the future, country by country, industry by industry, etc. DCaC offers mechanisms to ensure data compliance for workload placement and data meshes programmatically. DCaC may automate and abstract the underlying complexity of defining, configuring, monitoring, and enforcing compliance of data and processing policy, following a Low-Code/No-Code approach for DevSecOps teams, with insertion points at code/build, pre-deploy, deploy, and run time. This shift-left in data compliance may eliminate complex data discovery and manual data classification mechanisms found in conventional approaches.

While there have been shown and described illustrative embodiments that provide DCaC, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, program code of an application that defines annotations denoting a plurality of data types handled by the application;
   determining, by the device and for each of the plurality of data types, an association between that data type and a category of sensitive data;
   creating, by the device and based on the association for each of the plurality of data types, a protection binding that defines a data handling scope bonded to the association between that data type and its associated category of sensitive data; and
   causing, by the device, data compliance policies to be applied to the application according to its corresponding associations and protection bindings, wherein at least one of the data compliance policies controls how a particular category of sensitive data is stored, accessed, or processed by the application within one or more designated processing environments that are determined based on the category of sensitive data.

2. The method as in claim 1, wherein the association is defined by a programmer via a user interface or an application programming interface.

3. The method as in claim 1, wherein the device automatically infers the association from a corresponding annotation of the annotations in the program code.

4. The method as in claim 1, further comprising:
associating, by the device, a token having a predefined access scope with a particular category of sensitive data.

5. The method as in claim 1, wherein at least one of the data compliance policies controls where a particular category of sensitive data is stored by the application.

6. The method as in claim 1, wherein at least one of the data compliance policies controls how a particular category of sensitive data is accessed by the application.

7. The method as in claim 1, wherein at least one of the data compliance policies controls where a workload of the application that is associated with a particular category of sensitive data is executed.

8. The method as in claim 1, further comprising:
associating, by the device, a pointer to an encryption key with a particular category of sensitive data.

9. The method as in claim 1, further comprising:
automatically generating, by the device, data compliance constraints based on a type of the application or where the application will be deployed.

10. The method as in claim 9, wherein the device automatically generates the data compliance constraints based on a repository of industrial regulations, governmental regulations, or organizational regulations.

11. An apparatus, comprising:
one or more network interfaces;
a processor coupled to the one or more network interfaces and configured to execute one or more processes; and
a memory configured to store a process that is executable by the processor, the process when executed configured to:
obtain program code of an application that defines annotations denoting a plurality of data types handled by the application;
determine, for each of the plurality of data types, an association between that data type and a category of sensitive data;
create, based on the association for each of the plurality of data types, a protection binding that defines a data handling scope bonded to the association between that data type and its associated category of sensitive data; and
cause data compliance policies to be applied to the application according to its corresponding associations and protection bindings, wherein at least one of the data compliance policies controls how a particular category of sensitive data is stored, accessed, or processed by the application within one or more designated processing environments that are determined based on the category of sensitive data.

12. The apparatus as in claim 11, wherein the association is defined by a programmer via a user interface or an application programming interface.

13. The apparatus as in claim 11, wherein the apparatus automatically infers the association from a corresponding annotation of the annotations in the program code.

14. The apparatus as in claim 11, wherein the process when executed is further configured to:
associate a token having a predefined access scope with a particular category of sensitive data.

15. The apparatus as in claim 11, wherein at least one of the data compliance policies controls where a particular category of sensitive data is stored by the application.

16. The apparatus as in claim 11, wherein at least one of the data compliance policies controls how a particular category of sensitive data is accessed by the application.

17. The apparatus as in claim 11, wherein at least one of the data compliance policies controls where a workload of the application that is associated with a particular category of sensitive data is executed.

18. The apparatus as in claim 11, wherein the process when executed is further configured to:
automatically generate data compliance constraints based on a type of the application or where the application will be deployed.

19. The apparatus as in claim 18, wherein the process when executed is further configured to:
automatically generate the data compliance constraints based on a repository of industrial regulations, governmental regulations, or organizational regulations.

20. A tangible, non-transitory, computer-readable medium storing program instructions that cause a device to execute a process comprising:
obtaining, by the device, program code of an application that defines annotations denoting a plurality of data types handled by the application;
determining, by the device and for each of the plurality of data types, an association between that data type and a category of sensitive data;
creating, by the device and based on the association for each of the plurality of data types, a protection binding that defines a data handling scope bonded to the association between that data type and its associated category of sensitive data; and
causing, by the device, data compliance policies to be applied to the application according to its corresponding associations and protection bindings, wherein at least one of the data compliance policies controls how a particular category of sensitive data is stored, accessed, or processed by the application within one or more designated processing environments that are determined based on the category of sensitive data.

* * * * *